US012776110B2

(12) United States Patent
Scarbrough

(10) Patent No.: US 12,776,110 B2
(45) Date of Patent: Oct. 27, 2026

(54) AUGMENTED REALITY ENHANCED GROUP ACTIVITY DETERMINATION

(71) Applicant: Micron Technology, Inc., Boise, ID (US)

(72) Inventor: Alyssa N. Scarbrough, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 157 days.

(21) Appl. No.: 18/778,397

(22) Filed: Jul. 19, 2024

(65) Prior Publication Data

US 2025/0118030 A1 Apr. 10, 2025

Related U.S. Application Data

(60) Provisional application No. 63/542,915, filed on Oct. 6, 2023.

(51) Int. Cl.
*G06T 19/00* (2011.01)
*G06Q 50/10* (2012.01)

(52) U.S. Cl.
CPC ........... *G06T 19/006* (2013.01); *G06Q 50/10* (2013.01)

(58) Field of Classification Search
CPC .............................. G06T 19/006; G06Q 50/10
See application file for complete search history.

(56) References Cited

U.S. PATENT DOCUMENTS

| | | | | |
|---|---|---|---|---|
| 10,152,840 | B2 * | 12/2018 | Geraghty | G07C 11/00 |
| 10,410,249 | B2 | 9/2019 | Dewitt et al. | |
| 10,733,544 | B2 | 8/2020 | Sahadi | |
| 2018/0240151 | A1 * | 8/2018 | D'Andrea | G06Q 30/0252 |
| 2018/0349808 | A1 * | 12/2018 | Sahadi | G06Q 10/047 |

* cited by examiner

*Primary Examiner* — Daniel F Hajnik
*Assistant Examiner* — Thomas John Foster
(74) *Attorney, Agent, or Firm* — Schwegman Lundberg & Woessner, P.A.

(57) ABSTRACT

Systems and methods for determining an activity for first and second subgroups at a venue are disclosed including receiving information from a user interface of a user device associated with a group of users, determining a first estimated time for a first activity for the first subgroup, evaluating a plurality of activities to determine at least one of a second activity for the second subgroup or a third activity for the group proceeding the first and second activities to reduce an idle time of the group before the third activity, including using the determined first estimated time for the first activity for the first subgroup, and causing information about the determined second activity or the determined third activity to be displayed on a user experience application associated with the group.

19 Claims, 7 Drawing Sheets

AUGMENTED REALITY ENHANCED GROUP ACTIVITY DETERMINATION

PRIORITY APPLICATION

This application claims the benefit of priority to U.S. Provisional Application Ser. No. 63/542,915, filed Oct. 6, 2023, which is incorporated herein by reference in its entirety.

BACKGROUND

Navigating amusement parks can be challenging and frustrating for park visitors. Existing paper park maps have a number of limitations. They can be large, cumbersome, and easily lost or damaged. The maps provide the locations of park attractions and restaurants but lack real-time information like ride wait times. Visitors often waste time traveling to rides only to find long lines. It is also difficult for groups to stay together in the crowds when relying solely on paper maps. Visitors forget where they stored items in lockers and struggle to locate them later. Additionally, it can be difficult for groups to separate in the park and efficiently come back together later without substantial effort, information, ability, and awareness.

Electronic maps and other information displayed through an application on a user device (e.g., mobile device, etc.) for park visitors can provide a number of advantages, such as real-time locations of the visitor, real-time wait times for specific attractions, and directions for navigation. There is a need to further improve electronic maps using augmented reality to improve the amusement park experience.

BRIEF DESCRIPTION OF THE DRAWINGS

In the drawings, which are not necessarily drawn to scale, like numerals may describe similar components in different views. Like numerals having different letter suffixes may represent different instances of similar components.

The drawings illustrate generally, by way of example, but not by way of limitation, various embodiments discussed in the present document.

DETAILED DESCRIPTION

Figure 1:
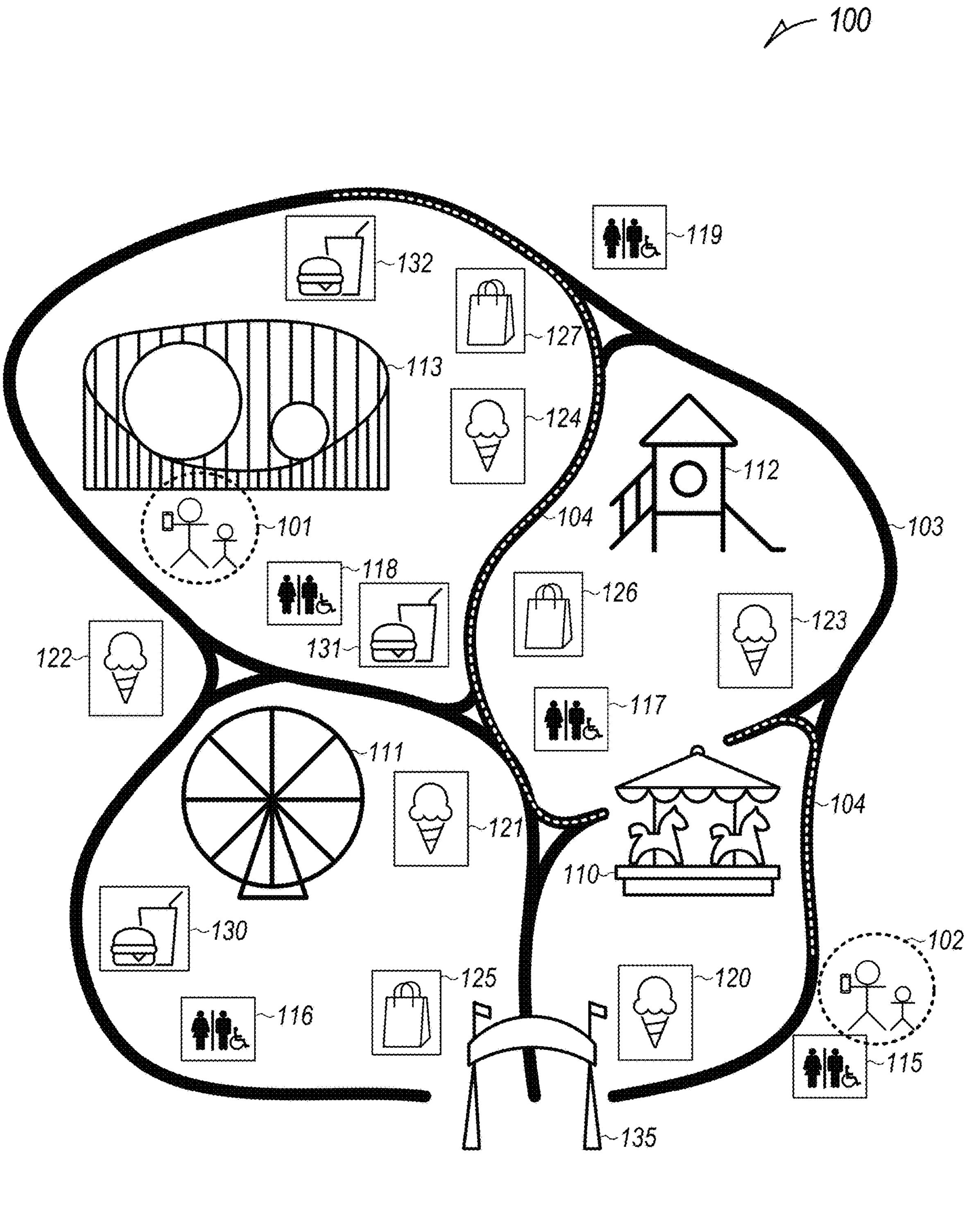
FIG. 1 illustrates an example representation of a venue.

Modern mapping systems employ static algorithms to optimize route guidance between locations at a time of request, solving for a desired result, such as to provide a shortest distance or a shortest time of travel for a user, avoiding certain types of travel, requiring others, etc. User experience applications executed on user devices of visitors to a venue can provide venue information, including route guidance and estimated travel times to specific resources, attractions, or locations at, within, or otherwise associated with the venue. In addition, user experience applications can utilize augmented or virtual reality hardware or content or rendering to provide a richer visitor experience, in certain examples bringing characters or scenes to life, or providing virtual obstacles, scenery, or other content associated with the venue (e.g., characters, specific attractions, etc.) to visitors, while navigating or waiting within the venue.

Different systems and methods manage visitor traffic and enhance visitor experience in different ways. For example, U.S. Pat. No. 10,733,544, "VENUE TRAFFIC FLOW MANAGEMENT", is directed to recommending different points of interest to different visitors of a venue to prevent congestion in the form of long queues or dense or large crowds at specific locations at the venue. U.S. Patent Application No. 2018/0240151, "ELECTRONIC ROUTING AND MESSAGING IN A VENUE BASED ON WAIT TIMES", provides different suggested routes and attractions based on calculated route and wait times, including incentives for different suggestions to alter visitor behavior to reduce venue congestion. U.S. Pat. No. 10,410,249, "IDENTIFICATION, LOCATION, AND AUTHENTICATION SYSTEMS AND METHODS", describes augmented reality views, directions, queuing, and estimated time of arrival for visitors and venues to reduce visitor churn and waiting. The mobile device application "Family Locator" provides an augmented reality real-time view of locations of friends and family through a camera view of the mobile device. However, these previously disclosed systems and methods do not facilitate different group members separating and efficiently coming back together at or within a venue, such as by different routes, through different locations, spending time at different attractions with variable and different wait times, and taking into account different navigation speed and preferences, and possibly separate starting times or locations of the different group members.

The present inventors have recognized, among other things, advances in selection and prioritization of activity and routing options and presentation of information corresponding to group guidance at or within a venue through a user experience applications executed on a user device of a user of a group at the venue, including optimizing guidance for the group or certain members or portions of the group, taking into account real-time information about other group members and venue resources to improve user experience of individual group members and, in certain examples, the aggregate experience of the group overall.

For example, the techniques presented herein enable adjustment and control of venue traffic to reduce congestion and improve venue resource efficiency as well as reduce the need for more resource intensive communication resources associated with traditional route selection and group guidance (e.g., voice communication and determination and distribution of activity information to group members). Such advances can effectively reduce network traffic, increase available network coverage, and reduce the need for additional network resources, freeing existing resources for use by other users for other purposes, etc. Although discussed herein primarily with respect to amusement or theme parks, such user experience applications are similarly applicable to other types of venues, including concert halls, stadiums, arenas, public parks, public spaces or districts, water parks, block parties, house parties, beer gardens, malls, stores, monuments, tourist attractions, etc.

In certain examples, information about venue resources can include information about ride times, visitor congestion, or the availability of specific resources, pathways, activities, or locations. Venues can detect or receive information about venue resources through various mechanisms, including sensors, networked computer resources, input from the venue, or through user experience applications executed on user devices of users (or visitors) at the venue, taking advantage of sensors or information made available from the user devices of the users. In other examples, user experience applications can be made available to users or groups of users at the venue through one or more other means, such as through one or more presentation terminals or kiosks available at the venue.

In an example, a user experience application of or otherwise available to a user of a group or a portion of the group can coordinate directions and wait times for the user or other group members given different queuing, resource, or activity information. Although discussed herein with respect to a user and a user experience application available to the user, such as a user experience application executed on a user device of the user, one or more other user experience applications of or otherwise available to one or more other users of the group can communicate with, present, or otherwise provide information about the group, in certain examples, at the direction of one or more other group members.

In certain examples, a group can be defined by visitors, specific subgroups of visitors (e.g., parent and child, etc.), by user devices (e.g., mobile devices, smartphones, smartwatches, augmented reality glasses, etc.) executing a user experience application, by users of devices, by users associated with user experience applications, or through other associations of users or visitors. Groups can be broken into various subgroups that may change membership or be assigned different subgroups at different times. For example, a first family of four with two small children may include first and second subgroups at a first time, the first subgroup including a first parent and a first child and the second subgroup including a second parent and a second child. However, at a second time, the first family of four may include first and second subgroups having different membership, such as the first parent now grouped with the second child, etc. In other examples, a family of four with older children may include a first subgroup for adults and one or more additional subgroups for the older children, each associated with one or more devices. Subgroup members can change at different times.

In an example, a user experience application associated with the group can receive a request for a first activity (e.g., an attraction, location, or other venue resource, such as a ride, a restroom, a water fountain, restaurant, food stand, etc.) for the first subgroup, determine and provide routing or queuing information to the first subgroup, track progress of the first subgroup during the first activity, and make that information available to other members of the group. In other examples, the user experience application can receive information about the first activity for the first subgroup, such as through input from a user, or using location information of a user device associated with the first subgroup, etc. In certain examples, the user experience application can provide an augmented or virtual reality representation or render of the first subgroup at a location of the first subgroup at the venue to the user experience application associated with the group (e.g., a user experience application of a second subgroup, etc.).

In certain examples, the user experience application can receive a request for a suggested activity, or may automatically suggest one or more activities to other members of the group (e.g., a second subgroup, etc.) for a time similar to or within a threshold amount of an estimated remaining time for the first activity (e.g., based on progress of the first subgroup, queueing time of the first activity, etc.), or combinations of activities based on activities available to one or more remaining members of the group (e.g., the second subgroup), such as based on information about one or more of the remaining members (e.g., age, height, interests, average walking speed, or other profile information, etc.). In certain examples, the threshold time can include a static amount of time (e.g., 5 minutes, 10 minutes, etc.). In other examples, the threshold can be dependent on other information, such as a distance between different subgroups, estimated durations of other activities, different route options between subgroups, etc. In other examples, the user experience application can receive a request for a specific second activity for the second subgroup, determine and provide routing or queuing information to the second subgroup, track progress of the second subgroup during the second activity, and make that information available to other members of the group (e.g., the first subgroup, etc.). The user experience application can additionally evaluate or provide one or more activities, such as a third activity or meeting location, for the group to meet at following the first and second activities, such as after the second activity is determined and provided to and selected by the second subgroup, etc. The user experience application can make certain determinations or suggestions using resources of the user device, or in certain examples, resources of a venue service available to the user experience application through a network, or combinations of the user device and the venue service.

In contrast to traditional routing applications, instead of providing the shortest distance or shortest time of travel for users, the user experience application can determine routes and suggestions to minimize idle time of the group or one or more subgroups, where idle time includes waiting time at a specific location for one or more subgroups of the larger group, such as after navigating to the specific location, separate from a transit time or distance associated with navigation or routing information, etc. For example, in certain instances it may be beneficial to route one subgroup on a longer or slower path to avoid having one subgroup waiting for another subgroup, instead suggesting common locations for shared events (e.g., meet at specific restaurants, third attractions, intermediate locations, etc.) determined to minimize idle time of the group.

For example, different resources of the park, such as easily overlooked details separate from rides or attractions, including themes, architecture, buildings, landscaping, etc., can be suggested as intermediate activities for group members to reduce or minimize idle time while one or more subgroups are mid-activity. To reduce or minimize idle time can be a relative measure, such as in contrast to picking a meeting spot and having each subgroup navigate organically. In situations where a first subgroup is lagging in progress, a route of the second subgroup can be altered or one or more sub-activities or resources can be suggested to slow the corresponding progress of the second subgroup in meeting the first subgroup. Alternatively, one or more alternate activities or meeting locations can be determined and provided for selection to the group to minimize idle time. Managing progress of the different subgroups can reduce anxiety and provide the freedom of different subgroups to partake in otherwise mid-activity resources, knowing that overall progress is managed by the user experience application to reduce waiting or idle time of the group, ensuring efficient use of available time. In other examples, other experiences, such as refreshments, treats, shopping, or character experiences can be recommended to different group members according to interests, with notifications provided by the user experience application for a time to depart to the next group activity. Queuing and ordering can be executed through the user experience application based on user progress to the experience to additionally minimize idle time and improve user experience at the venue.

In addition, the user experience application can use augmented reality or virtual reality to bring the venue map to life in real time, such as by providing an augmented or virtual reality view or render of the venue through a camera view of a user device (e.g., a smartphone, smartwatch, etc.), to augmented reality glasses, or through one or more display screens or other augmented or virtual reality hardware available for use at the venue (e.g., presentation terminals, kiosks, etc.). In certain examples, a representation of the venue, activity, or resource of the venue can be shown, in certain examples, overlaying representations of one or more users of the group. Venue details, such as attractions, locations, etc., can be zoomed in on to show a preview or representation, as well as other information (e.g., queuing, restrictions (e.g., age, height, health concerns, etc.)), such as to limit attractions or locations not available to the user (e.g., or one or more members of a group or subgroup, etc.). Real-time wait times for attractions, events, or locations (e.g., rides, food or drink wait times, etc.) can be highlighted, and the user experience application can show advertisements for the venue or aspects of the venue or third-party products while users wait. Additionally, group member location can be shown and tracked, as well as parking location, locker use, location of other items (e.g., strollers, umbrellas, baby changing stations, wheelchairs, etc.), and reminders can be provided before exiting the venue so no items are lost or mislaid.

FIG. 1 illustrates an example representation of a venue 100, such as a map of an amusement park, etc., including first and second subgroups 101, 102 of a group at different locations of the venue and locations of different venue resources and user pathways 103 available for travel through the venue, including a determined route 104 for the second subgroup to a specific venue resource. In certain examples, venue resources can include one or more different activities, attractions, locations, rides, restrooms, water fountains, restaurants, food stands, or other resources of the venue.

In the example of FIG. 1, venue resources include locations, such as an entrance/exit 135, attractions or activities, such as a first activity 110 (e.g., a merry-go-round), a second activity 111 (e.g., a Ferris wheel), a third activity 112 (e.g., a playground), and a fourth activity 113 (e.g., a roller coaster), or first, second, third, fourth, and fifth restrooms 115, 116, 117, 118, 119. In an example, an activity can include a "turn" on, a trip to, a visit to, or a time using one or more venue resources, including wait times or in certain example, dining, etc. Venue resources can include kiosks, such as first, second, third, fourth, or fifth kiosks 120, 121, 122, 123, 124, stores, such as first, second, or third stores 125, 126, 127, or restaurants or food stands, such as first, second, or third restaurants 130, 131, 132, etc.

Figure 2:
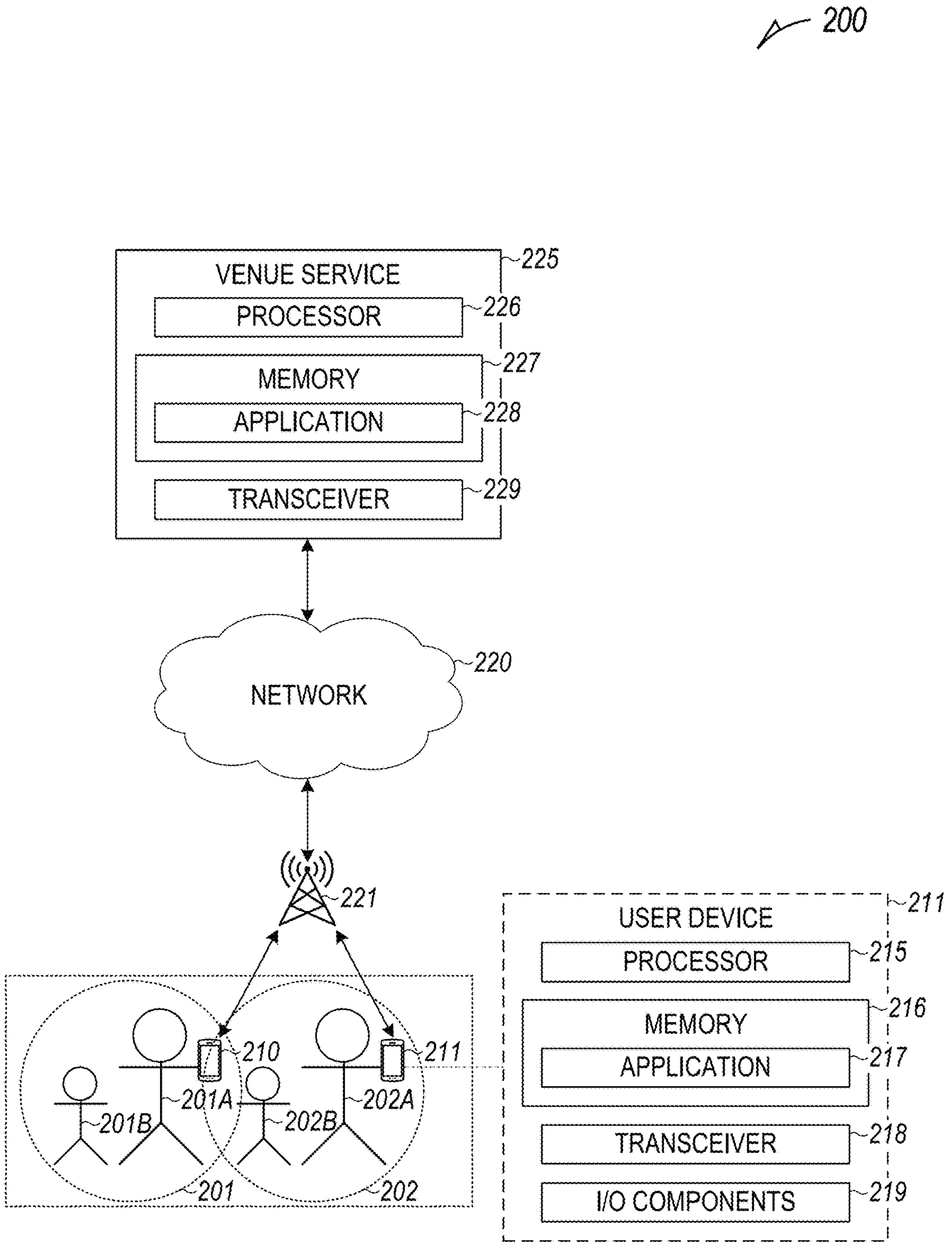
FIG. 2 illustrates an example system including first and second user devices of first and second subgroups of a group.

FIG. 2 illustrates an example system 200 including first and second user devices 210, 211 of first and second subgroups 201, 202 of a group, the first and second user devices 210, 211 coupled to a venue service 225 over a network 220, such as through one or more cellular towers 221 or other antennas, transmitters, receivers, routers, or access points to the network 220, etc. The first subgroup 201 includes a first user 201A and a first child 201B, the first user 201A having the first user device 210. The second subgroup 202 includes a second user 202A and a second child 202B, the second user 202A having the second user device 211.

The second user device 211 is exemplary and includes a processor 215 (e.g., one or more processors), a memory 216, one or more applications 217 (e.g., a user experience application, etc.), a transceiver 218, and one or more input/output (I/O) components 219. In an example, the user experience application can be executed at least in part by the second user device 211 and be configured to interact with or connect to one or more aspects of the venue service 225. While the user experience application can be executed on the second user device 211 (or one or more other user devices), the venue service 225 is separate and remote from the first and second user devices 210, 211, and can include a server, network, or cloud-based services accessible over the network 220. The venue service 225 can include a processor 226 (e.g., one or more processors), a memory 227, one or more applications 228 (e.g., a user experience application, a navigation application, routing application, etc.), and a transceiver 229.

In an example, the user experience application can include a local client installed on the second user device 211 and connected to the venue service 225, such as a cloud- or web-based service or platform. In other examples, the user experience application can include a virtual application (e.g., a network-, web-, server-, or cloud-based application) accessing resources of the second user device 211, or combinations of a local client and a virtual application, etc.

Figure 3:
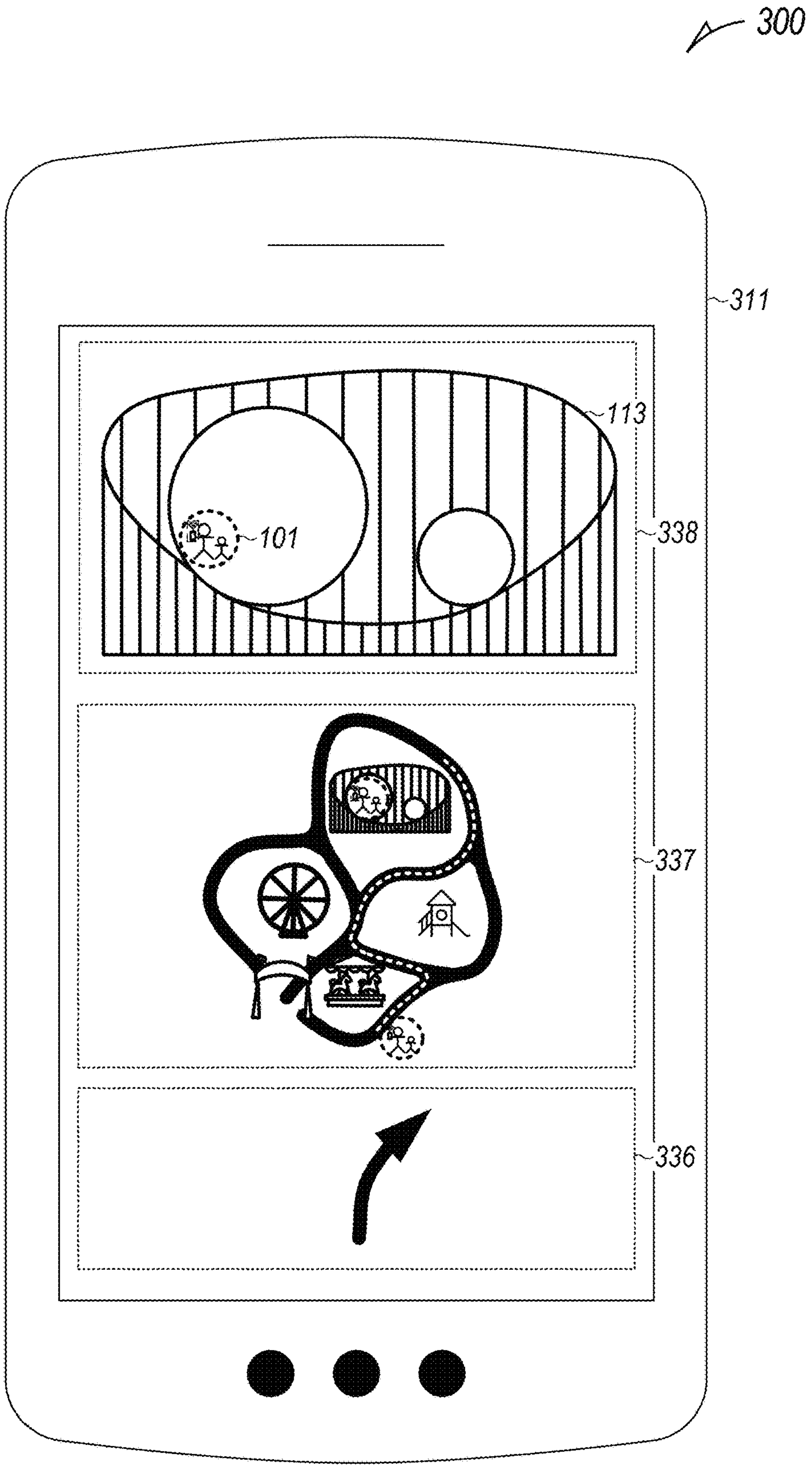
FIGS. 3-4 illustrates example user experience application views of user experience applications executed on one or more user devices.

FIG. 3 illustrates an example user experience application view 300 of a user experience application executed on a second user device 311 including a routing instruction 336 (e.g., a gentle right turn) displayed on a display screen of the second user device 311 providing routing information for a second subgroup from a first location (e.g., a current location, such as a location of a second activity) to a desired location (e.g., a location of a third activity, such as a ride, a restaurant, a meeting location, or one or more other venue resources, etc.).

The user experience application view 300 can include one or more of an orientation view of a determined route 337 or a representation of a location 338 of the first subgroup 101 or one or more other subgroups of the group including the second subgroup, etc. In an example, the orientation view of the determined route 337 can include a representation of the determined route (e.g., in dashed lines along the path) with respect to a map of the venue including one or more major landmarks, attractions, or activities. In an example, the orientation view of the determined route 337 can rotate with respect to the orientation of the second user device 311, for example, using direction, orientation, or camera information from the second user device 311, etc.

For example, one or both of the determined route 337 or the representation of the location 338 can include a representation of the first subgroup 101, an augmented reality view of an activity or venue resource associated with a received location or determined estimate location of the first subgroup 101, or combinations thereof, such as determined using location information of the first subgroup 101, one or more model or render of the venue or activities, etc. In an example, the representation of the location 338 can include an augmented reality view of a representation of the first subgroup 101 overlaid at the representation of the location 338 corresponding to the received location or determined estimate location of the first subgroup 101.

In this example, the second subgroup, for example, after using the restroom and seeing that the first subgroup is on a ride, can request a recommended second activity for the time that the first subgroup is on the ride, and a recommended third activity to meet the first subgroup, where the second and third activities can be determined by the user experience application or a venue service coupled to the user experience application to reduce an idle time of the first and second subgroups before the third activity. Once selected, the user experience application can provide a notification to the first subgroup of the third activity, such as through a user experience application executed on a user device associated with the first subgroup. In an example, the notification can include information about the third activity, including directions to the third activity, etc. Using the example user experience application view 300, the second activity can include stopping at a park, another activity, or a taking a specific path to the third activity, which can include a restaurant, a kiosk, etc., with directions for the second subgroup indicated by the dotted line and the routing instruction 336.

Figure 4:
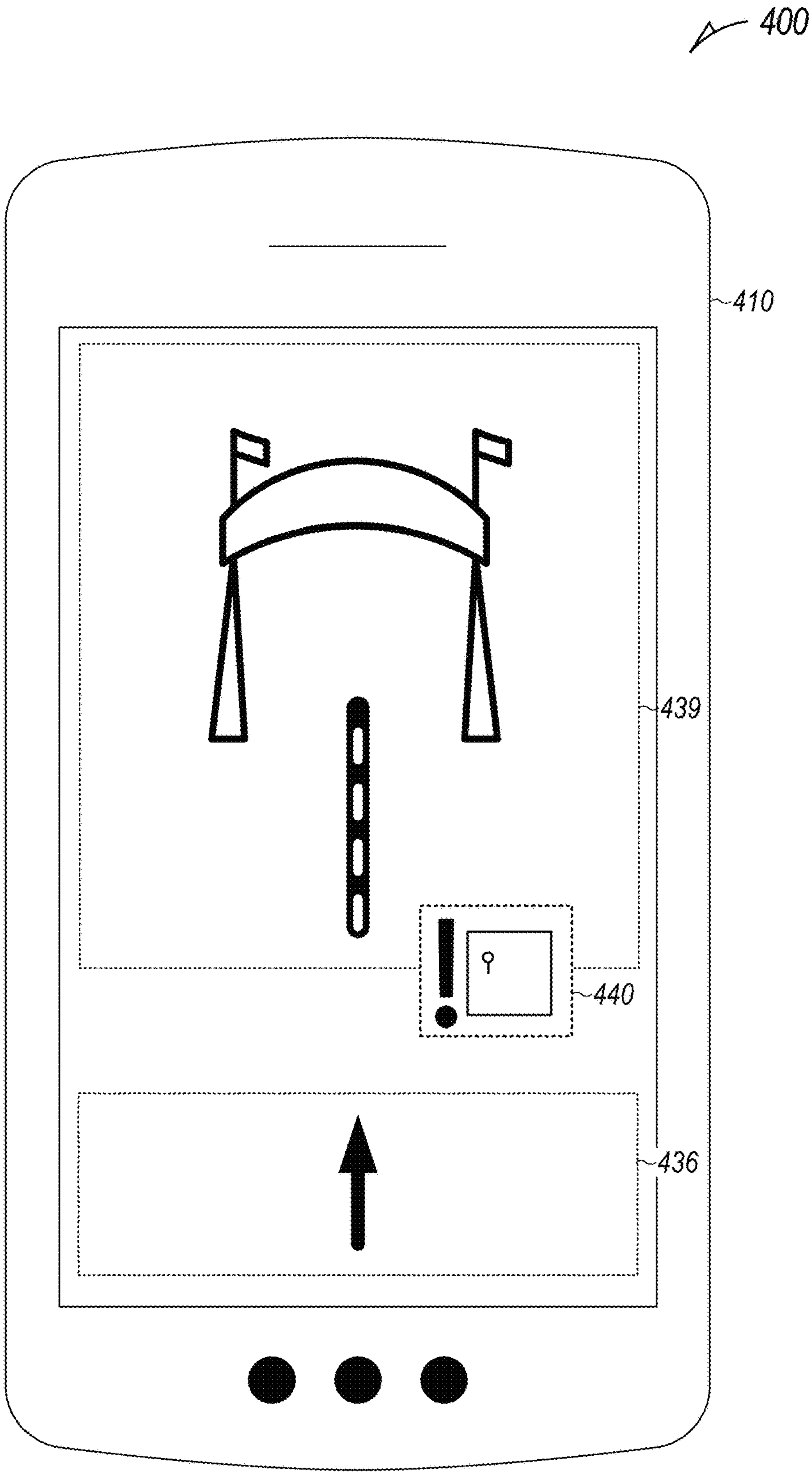

FIG. 4 illustrates an example user experience application view 400 of a user experience application executed on a first user device 410 including a routing instruction 436 (e.g., a forward arrow) displayed on a display screen of the first user device 410 providing routing information for a first subgroup to a desired location (e.g., an entrance/exit of the venue).

The user experience application view 400 can include an orientation view of a determined route 439, such as a remaining portion of the determined route 439 to the entrance/exit of the venue, including a representation of the determined route (e.g., in dashed lines along the path) with respect to a remaining portion of a map of the venue including one or more major landmarks, attractions, or activities. In an example, the orientation view of the determined route 439 can rotate with respect to the orientation of the first user device 410, for example, using direction, orientation, or camera information from the first user device 410, etc. In certain examples, the determined route 439 can include an augmented reality view, including a representation of the representation of the determined route (e.g., the dashed line) overlaid onto a real-world view of a camera of the first user device 410, opposite the face of the display screen of the first user device 410.

In certain examples, the user experience application view 400 can additionally include a notification 440 to alert the user of one or more conditions, including, for example, that the user is approaching an exit without retrieving a stored item, such as a stored item in a locker, a parked stroller, or one or more other checked items, etc.

Figure 5:
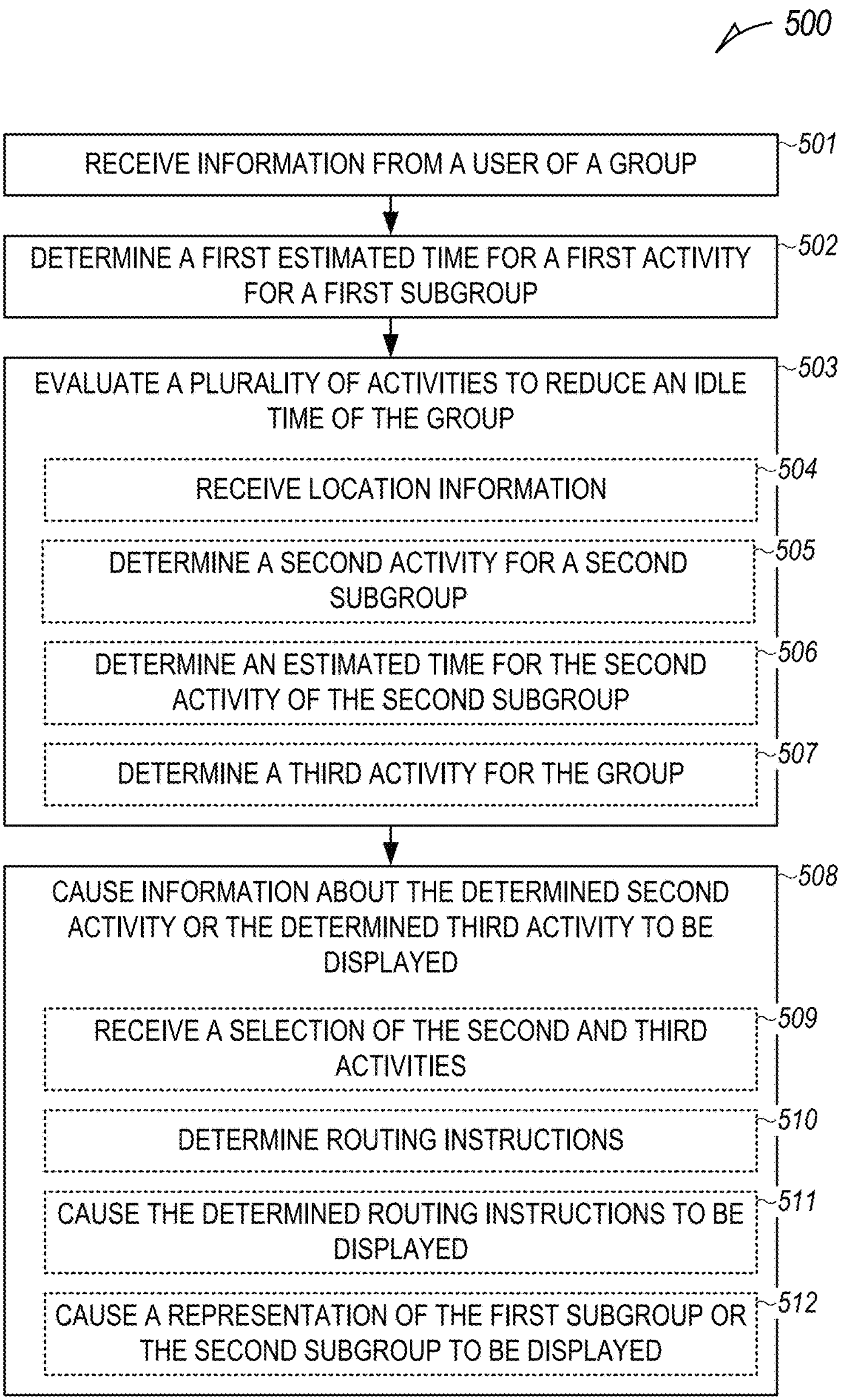
FIG. 5 illustrates an example method for determining one or more activities for a group or a subgroup of the group.

FIG. 5 illustrates an example method 500 for determining one or more activities for a group or a subgroup of the group, such as one or more activities associated with a venue, and causing information about the determined one or more activities to be displayed on a user experience application executed on a user device of a user of the group or the subgroup, such as to aid selection, planning, or navigation of the subgroup to one or more activities or resources associated with the venue.

At step 501, a request for information can be received from a user, such as through a user interface of one or more user devices associated with a group of users, using one or more I/O components of a user device, etc. The group of users can include first and second subgroups. Each of the first and second subgroups can include at least one user. The request for information can include a request to determine one or more activities for different subgroups of the group taking into account information about the one or more subgroups, such as location information of the subgroups, and information about the one or more activities, such as real-time congestion, wait times, or other information about the activities.

In certain examples, the user interface of the user device can include an interface of a user experience application executed on the user device and associated with the group, such as one of the first or second subgroups, or at least one user of the group, the first or second subgroups, or one or more other subgroups of the group. In an example, the user experience application can include a user experience application made available to users of the venue. In certain examples, the request for information can include request for routing information to one or more activities or resources associated with the venue.

In certain examples, the request for information can be received from a user of a second subgroup of the group, and can include a first activity of a first subgroup and a request for a recommended second activity (or one or more activities) for the second subgroup or one or more other subgroups, in certain examples, in addition to a request for a recommended third activity for the first and second subgroups or two or more other subgroups of the group to meet subsequent to one or both of the first and second activities, taking into account estimated times of the first activity, the second activity, times associated with waiting or traveling to or between activities, etc.

At step 502, a first estimated time can be determined for a first activity for a first subgroup, such as using a processor or an application of one or more user devices, a processor or an application of a venue service remote from the user device, or combinations thereof. The first estimated time can include an estimated remaining time for the first subgroup to complete the first activity. If the first subgroup is not yet at the first activity, the first estimated time can include a transit time to the first activity, a wait time once the first subgroup arrives at the first activity, and a ride time or other time to complete the first activity, and in certain examples exit the first activity.

At step 503, a plurality of activities can be evaluated, such as using a processor or an application of one or more user devices, a processor or an application of a venue service remote from the user device, or combinations thereof. In certain examples, the plurality of activities can be evaluated to determine at least one of the first activity (or one or more activities) for the first subgroup or the second activity (or one or more activities) for the or the third activity for the group or two or more subgroups of the group. The third activity can include an activity proceeding the first and second activities. In certain examples, one or more of the second or third activities can be evaluated and determined to reduce an idle time of the group or one or both of the first and second subgroups before the third activity, such as using the determined first estimated time for the first activity for the first subgroup.

In an example, reducing an idle time of the group can include reducing a combination of a first idle time of the first subgroup after completion of the first activity and before a start of the third activity (in certain examples, excluding a transit time of the first subgroup between the first and third activities) and a second idle time of the second subgroup after completion of the second activity and before the start of the third activity (in certain examples, excluding a transit time of the second subgroup between the first and third activities), wherein the third activity includes an activity for both of the first and second subgroups (e.g., starting after arrival of both of the first and second subgroups).

In certain examples, evaluating the plurality of activities can include performing one or more of steps 504-507. For example, at step 504, location information can be received, such as using a processor or an application of one or more user devices, a processor or an application of a venue service remote from the user device, or combinations thereof. In certain examples, the location information can include location information about the first subgroup or one or more user devices associated with the first subgroup, location information about the second subgroup or one or more user devices associated with the second subgroup, or location information selected by or received from one or more users of the group. In other examples, location information can include location information about one or more activities or resources of the venue, pathways available to the group, etc. The location information can be used to evaluate the plurality of activities, determine one or more estimated times, or to determine one or more activities for the group or one or more subgroups.

At step 505, a second activity can be determined for the second subgroup, and at step 506, an estimated time for the second activity of the second subgroup can be determined, such as using a processor or an application of one or more user devices, a processor or an application of a venue service remote from the user device, or combinations thereof. In certain examples, the order of any one or more of the steps described herein, such as steps 505 and 506, can be reordered, or various combinations or subcombinations of steps can be performed in the presented order or one or more different orders. For example, the estimated time can be determined prior as part of evaluating the plurality of activities, such as prior to making a final determination of the second activity (or one or more other activities, etc.) and presenting the determined second activity to the user, such as for selection, etc.

At step 507, a third activity can be determined for the group, the first and second subgroups, or two or more other subgroups or users of the group, such as using a processor or an application of one or more user devices, a processor or an application of a venue service remote from the user device, or combinations thereof. In an example, evaluating the plurality of activities can include to determine the second and third activities can include determining one or more estimated times, and determining the second and third activities to reduce a difference between the determined one or more estimated times, or determining combinations of activities to one or more users of the group for selection.

For example, an estimated time of the first subgroup to arrive at the third activity can be determined, including the determined first estimated time for the first activity for the first subgroup, using information about the first subgroup and information about the venue. Information about the first subgroup can include, among other things, location information of the first subgroup, average walking speed of different members of the first subgroup, etc. Information about the venue can include, among other things, a location of the first and third activities (e.g., entrance location, exit location, etc.), mapping information of the venue (e.g., between the first subgroup and an entrance of the first activity, between an exit of the first activity and an entrance of the third activity, etc.), one or more times associated with the first and third activities (e.g., real-time wait time, ride time, availability of fast passes or remote queuing, etc.).

Similarly, an estimated time of the second subgroup to arrive at the third activity can be determined using information about the second subgroup and information about the venue. An estimated idle time of the group before the third activity can be determined using a difference between the determined one or more estimated times.

For example, a first time for the first subgroup to arrive at the third activity can be determined, including a transit time for the first subgroup to the first activity, an activity time for the first subgroup for the first activity (e.g., the determined first estimated time for the first activity for the first subgroup), and a transit time for the first subgroup from the first activity to the third activity. A second time for the second subgroup to arrive at the third activity can be determined, including a transit time for the second subgroup to the second activity, an activity time for the second subgroup for the second activity, and a transit time for the second subgroup from the second activity to the third activity. In an example, the activity time for the first subgroup for the first activity can include a wait time for the start of the first activity for the first subgroup after the first subgroup arrives at the first activity, determined using received real-time wait time information for the first activity and received location information for the first subgroup. Further, the activity time for the second subgroup for the second activity can include a wait time for the start of the second activity for the second subgroup after the second subgroup arrives at the second activity, determined using received real-time wait time information for the second activity and received location information for the second subgroup.

The second and third activities can be determined to reduce a difference between the first and second times. In certain examples, a number of options of second and third activities having a difference between the first and second times below a threshold (e.g., within 10 minutes, 5 minutes, etc.) can be provided to the group, such as to one or more users of the group, for selection.

At step 508, information can be displayed, such as through one or more I/O components of a user device, etc., in certain examples through the user experience application. The information can include information about one or more of the determined first, second, or third activities, or other information about the venue, one or more other activities, or the group. In certain examples, the venue service can cause the information about the determined second activity or the determined third activity to be displayed on the user device or through the user experience application executed on the user device associated with at least one user of the group, the first or second subgroups, or one or more other subgroups of the group. In other examples, the user experience application can cause the information to be displayed on the user device or through the user experience application.

At step 509, a selection of one or more of the second and third activities can be received from at least one user of the group, the first or second subgroups, or one or more other subgroups of the group, such as through a user interface of one or more user devices associated with a group, using one or more I/O components of a user device, through the user experience application, etc., in response to the displayed information.

At step 510, routing instructions can be determined, such as using a processor or an application of one or more user devices, a processor or an application of a venue service remote from the user device, or combinations thereof. The routing instructions can be determined using mapping information about the venue, and in certain examples, taking into account walking speeds of one or more users of the group, etc.

At step 511, the determined routing instructions can be displayed, such as through one or more I/O components of a user device, etc., in certain examples through the user experience application. In certain examples, the venue service can cause the determined routing instructions to be displayed on the user device or through the user experience application executed on the user device associated with at least one user of the group, the first or second subgroups, or one or more other subgroups of the group. In other examples, the user experience application can cause the determined routing instructions to be displayed on the user device or through the user experience application.

At step 512, a representation of one or more users or subgroups of the group can be displayed, such as through one or more I/O components of a user device, etc., in certain examples through the user experience application. In an example, the representation of the one or more suers or subgroups of the group can include a representation of a location of the one or more users or subgroups of the group at the venue, determined using received location information. In certain examples, the venue service can cause the representation of one or more users or subgroups to be displayed on the user device or through the user experience application executed on the user device associated with at least one user of the group, the first or second subgroups, or one or more other subgroups of the group. In other examples, the user experience application can cause the representation of one or more users or subgroups to be displayed on the user device or through the user experience application.

Figure 6:
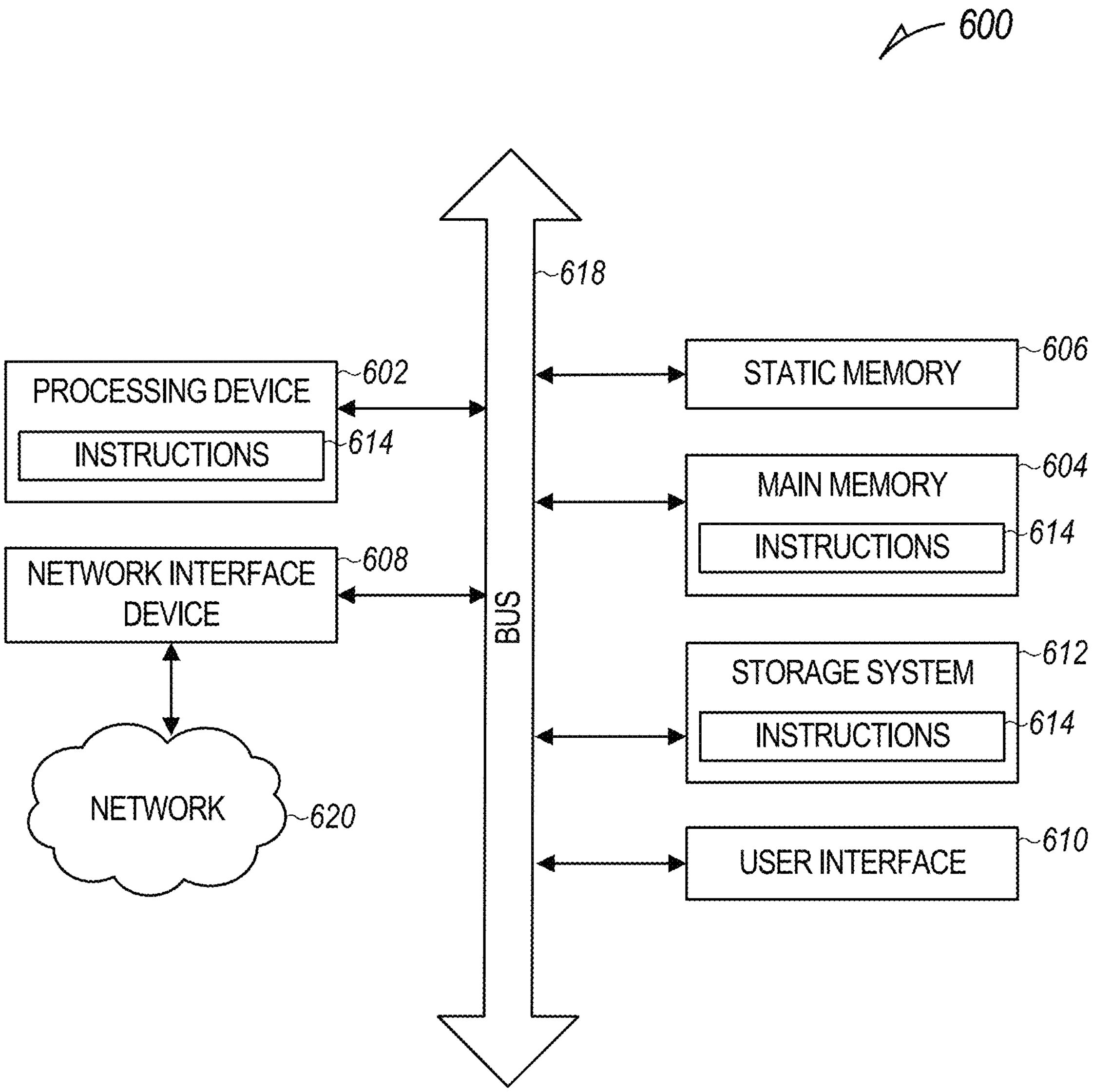
FIG. 6 illustrates a block diagram of an example machine upon which any one or more of the techniques discussed herein may perform.

FIG. 6 illustrates a block diagram of an example machine 600 (e.g., a host system, a user device, a server, etc.) upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may function as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine 600 (e.g., computer system, a host system, a user device, etc.) may include a processing device 602 (e.g., a hardware processor, a central processing unit (CPU), a graphics processing unit (GPU), a hardware processor core, or any combination thereof, etc.), a main memory 604 (e.g., read-only memory (ROM), dynamic random-access memory (DRAM), a static memory 606 (e.g., static random-access memory (SRAM), etc.), and a storage system 612, some or all of which may communicate with each other via a communication interface 618 (e.g., a bus).

The processing device 602 can represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 can be configured to execute instructions 614 for performing the operations and steps discussed herein. The machine 600 can further include a network interface device 608 to communicate over a network 620.

The storage system 612 can include a machine-readable storage medium (also known as a computer-readable medium) on which is stored one or more sets of instructions 614 or software embodying any one or more of the methodologies or functions described herein. The instructions 614 can also reside, completely or at least partially, within the main memory 604 or within the processing device 602 during execution thereof by the machine 600, the main memory 604 and the processing device 602 also constituting machine-readable storage media.

The term "machine-readable storage medium" should be taken to include a single medium or multiple media that store the one or more sets of instructions, or any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 600 may further include a user interface 610, such as one or more of a display unit, an alphanumeric input device (e.g., a keyboard), and a user interface (UI) navigation device (e.g., a mouse), an I/O component of a user device, etc. In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 600 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 614 (e.g., software, programs, an operating system (OS), etc.) or other data are stored on the storage system 612 can be accessed by the main memory 604 for use by the processing device 602. The main memory 604 (e.g., DRAM) is typically fast, but volatile, and thus a different type of storage than the storage system 612 (e.g., an SSD), which is suitable for long-term storage, including while in an "off" condition. The instructions 614 or data in use by a user or the machine 600 are typically loaded in the main memory 604 for use by the processing device 602. When the main memory 604 is full, virtual space from the storage system 612 can be allocated to supplement the main memory 604; however, because the storage system 612 device is typically slower than the main memory 604, and write speeds are typically at least twice as slow as read speeds, use of virtual memory can greatly reduce user experience due to storage system latency (in contrast to the main memory 604, e.g., DRAM). Further, use of the storage system 612 for virtual memory can reduce the usable lifespan of the storage system 612.

The instructions 614 may further be transmitted or received over a network 620 using a transmission medium via the network interface device 608 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 608 may include one or more physical jacks (e.g., Ethernet, coaxial, or phone jacks) or one or more antennas to connect to the network 620. In an example, the network interface device 608 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600, and includes digital or analog communications signals or other intangible medium to facilitate communication of such software.

Figure 7:
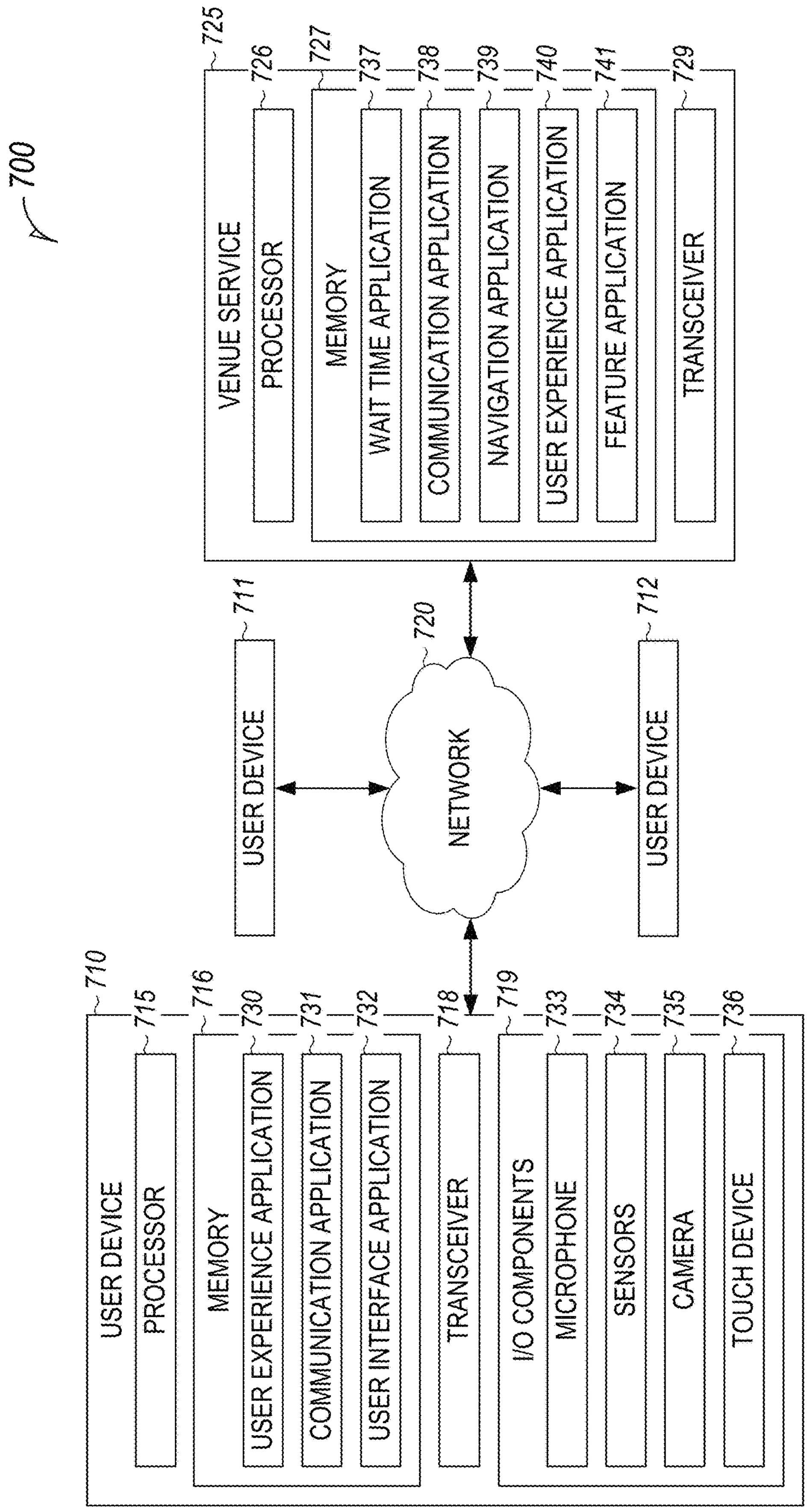
FIG. 7 illustrates an example system including one or more user devices communicating with a venue service over a network.

FIG. 7 illustrates an example system 700 including a first user device 710 in a networking environment including a venue service 725 communicating over a network 720. In certain examples, the first user device 710 is exemplary and the system 700 can include one or more other user devices, such as a second user device 711, a third user device 712, etc.

The first user device 710 can include a processor 715 (e.g., one or more processors), a memory 716, a transceiver 718, input/output (I/O) components 719, and in certain examples, one or more presentation components, one or more I/O ports, etc. The first user device 710 can take the form of a mobile computing device or any other portable device, such as a mobile telephone, laptop, tablet, computing pad, notebook, gaming device, portable media player, smartwatch, smart glasses, augmented or virtual reality device, etc. In other examples, the first user device 710 can include a less portable device, such as desktop personal computer, kiosk, tabletop device, industrial control device, etc. Other examples can incorporate the first user device 710 as part of a multi-device system in which two separate physical devices share or otherwise provide access to the illustrated components of the first user device 710.

The processor 715 can include any quantity of processing units and is programmed to execute computer-executable instructions for implementing aspects of the disclosure. The instructions may be performed by the processor or by multiple processors within the computing device or performed by a processor external to the first user device 710. In some examples, the processor 715 is programmed to execute methods, such as the one or more methods illustrated herein, etc. Additionally, or alternatively, the processor 715 can be programmed to present an experience in a user interface ("UI"). For example, the processor 715 can represent an implementation of techniques to perform the operations described herein.

The memory 716 can include one or more applications, such as a user experience application 730, in certain examples configured to interact with or connect to the venue service 725 or one or more other services, such as an animation service configured to provide one or more augmented or virtual reality animations or representations to the first user device 710, etc. While the user experience application 730 can be executed on the first user device 710 (or one or more other user devices), the venue service 725 or one or more other services can include separate services separate and remote from the first user device 710, and can include a server, network, or cloud-based services accessible over the network 720.

In an example, the user experience application 730 can include a local client installed on the first user device 710 and connected to the venue service 725, such as a cloud-based meeting service or platform. In other examples, the user experience application 730 can include a virtual application (e.g., a network-, web-, server-, or cloud-based application) accessing resources of the first user device 710, or combinations of a local client and a virtual application, etc.

The communication application 731 and the user interface application 732 can include one or more applications configured to provide communication or to control one or more aspects of the user interface of the first user device 710, such as communication between user devices or users, to provide one or more displays or augmented or virtual reality views of different aspects, etc.

The transceiver 718 can include an antenna capable of transmitting and receiving radio frequency ("RF") signals and various antenna and corresponding chipsets to provide communicative capabilities between the first user device 710 and one or more other remote devices. Examples are not limited to RF signaling, however, as various other communication modalities may alternatively be used.

The I/O components 719 can include a presentation component, which can include, without limitation, computer monitors, televisions, projectors, touch screens, phone displays, tablet displays, wearable device screens, televisions, speakers, vibrating devices, and any other devices configured to display, verbally communicate, or otherwise indicate image search results to a user of the first user device 710 or provide information visibly or audibly on the first user device 710. For example, the first user device 710 can include a smart phone or a mobile tablet including speakers capable of playing audible search results to the user. In other examples, the first user device 710 can include a computer in a car that audibly presents search responses through a car speaker system, visually presents search responses on display screens in the car (e.g., situated in the car's dashboard, within headrests, on a drop-down screen, etc.), or combinations thereof. Other examples present the disclosed search responses through various other display or audio components.

In an example, the I/O components 719 can include a microphone 733, one or more sensors 734, a camera 735, and a touch device 736. The microphone 733 can capture speech from the user and/or speech of or by the user. The one or more sensors 734 can include any number of sensors on or in a mobile computing device, electronic toy, gaming console, wearable device, television, vehicle, or other device, such as one or more of an accelerometer, magnetometer, pressure sensor, photometer, thermometer, global positioning system ("GPS") chip or circuitry, bar scanner, biometric scanner for scanning fingerprint, palm print, blood, eye, or the like, gyroscope, near-field communication ("NFC") receiver, or any other sensor configured to capture data from the user or the environment. The camera 735 can capture images or video of or by the user. The touch device 736 can include a touchpad, track pad, touch screen, or other touch-capturing device. In other examples, the I/O components 719 can include one or more of a sound card, a vibrating device, a scanner, a printer, a wireless communication device, or any other component for capturing information related to the user or the environment.

The memory 716 can include any quantity of memory associated with or accessible by the first user device 710. The memory 716 can be internal to the first user device 710, external to the first user device 710, or a combination thereof. The memory 716 can include, without limitation, random access memory (RAM), read only memory (ROM), electronically erasable programmable read only memory (EEPROM), flash memory or other memory technologies, CDROM, digital versatile disks (DVDs) or other optical or holographic media, magnetic cassettes, magnetic tape, magnetic disk storage or other magnetic storage devices, memory wired into an analog computing device, or any other medium for encoding desired information and for access by the first user device 710. The terms computer-readable medium, machine readable medium, and storage device do not include carrier waves to the extent carrier waves are deemed too transitory. The memory 716 can take the form of volatile and/or nonvolatile memory, can be removable, non-removable, or a combination thereof; and can include various hardware devices, e.g., solid-state memory, hard drives, optical-disc drives, etc. Additionally, or alternatively, the memory 716 can be distributed across multiple user devices, such as in a virtualized environment in which instruction processing is carried out on multiple ones of the first user device 710. The memory 716 can store, among other data, various device applications that, when executed by the processor 715, operate to perform functionality on the first user device 710. Example applications can include search applications, instant messaging applications, electronic-mail application programs, web browsers, calendar application programs, address book application programs, messaging programs, media applications, location-based services, search programs, and the like. The applications may communicate with counterpart applications or services such as web services accessible via the network 720. For example, the applications can include client-operating applications that correspond to server-side applications executing on remote servers or computing devices in the cloud.

Instructions stored in the memory 716 can include, among other things, one or more of a user experience application 730, a communication application 721, and a user interface application 732 executed on the first user device 710. The communication application 721 can include one or more of computer-executable instructions for operating a network interface card and a driver for operating the network interface card. Communication between the first user device 710 and other devices can occur using any protocol or mechanism over a wired or wireless connection or across the network 720. In some examples, the communication application 721 is operable with RF and short-range communication technologies using electronic tags, such as NFC tags, Bluetooth® brand tags, etc.

In some examples, the user interface application 732 includes a graphics application for displaying data to the user and receiving data from the user. The user interface application 732 can include computer-executable instructions for operating the graphics card to display search results and corresponding images or speech on or through the presentation components. The user interface application 732 can interact with the one or more sensors 734 and camera 735 to both capture and present information through the presentation components.

In an example, the venue service 725 can be configured to receive user, device, or environment data, such as received from the first user device 710 or one or more other devices over the network 720. In certain examples, the venue service 725 can include one or more servers, memory, databases, or processors, configured to execute different web-service computer-executable instructions, and can be configured to provide and manage one or more meeting services for one or more users or groups of users, such as users of the first user device 710 or one or more other devices.

The networking environment illustrated in FIG. 7 is an example of one suitable computing system environment and is not intended to suggest any limitation as to the scope of use or functionality of examples disclosed herein. The illustrated networking environment should not be interpreted as having any dependency or requirement related to any single component, module, index, or combination thereof, and in other examples, other network environments are contemplated.

The network 720 can include the internet, a private network, a local area network (LAN), a wide area network (WAN), or any other computer network, including various network interfaces, adapters, modems, and other networking devices for communicatively connecting the first user device 710, the venue service 725, or one or more other devices or services. The network 720 can also include configurations for point-to-point connections.

The venue service 725 includes a processor 726 to process executable instructions, a memory 727 embodied with executable instructions, and a transceiver 729 to communicate over the network 720. The memory 713 can include one or more of: a wait time application 737 configured to determine one or more estimated wait times, such as using received real-time or other information about one or more activities of a venue; a communication application 738; a navigation application 739 configured to determine one or more navigation or routing instructions between locations or activities; a user experience application 740; a feature application 741; or one or more other applications, modules, or devices, etc. While the venue service 725 is illustrated as a single box, it is not so limited, and can be scalable. For example, the venue service 725 can include multiple servers operating various portions of software that collectively generate composite icons or templates for users of the first user device 710 or one or more other devices.

In certain examples, the venue service 725 can include or otherwise be coupled to, such as over the network, with one or more databases, such as a user database, to provide backend storage of Web, user, and environment data that can be accessed over the network 720 by the venue service 725 or the first user device 710 and used by the venue service 725 to make one or more determinations, etc. The Web, user, and environment data stored in the database includes, for example but without limitation, one or more user profiles and user configurations, data from users, data about venues, historical or average ride or wait times, mapping information, etc. Additionally, though not shown for the sake of clarity, the servers of the user database can include their own processors, transceivers, and memory.

The user profiles can include electronically stored collection of information related to the user. Such information can be stored based on a user's explicit agreement or "opt-in" to having such personal information be stored, the information including the user's name, age, gender, height, weight, demographics, current location, residency, citizenship, family, friends, schooling, occupation, hobbies, skills, interests, Web searches, health information, birthday, anniversary, celebrated holidays, moods, user's condition, and any other personalized information associated with the user. The user profile includes static profile elements, e.g., name, birthplace, etc., and dynamic profile elements that change over time, e.g., residency, age, condition, etc.

Additionally, the user profiles can include static and/or dynamic data parameters for individual users. Examples of user profile data include, without limitation, a user's age, gender, race, name, location, interests, Web search history, social media connections and interactions, purchase history, routine behavior, jobs, or virtually any unique data points specific to the user. The user profiles can be expanded to encompass various other aspects of the user.

The above detailed description includes references to the accompanying drawings, which form a part of the detailed description. The drawings show, by way of illustration, specific embodiments in which the invention can be practiced. These embodiments are also referred to herein as examples. Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

As used herein, directional adjectives, such as horizontal, vertical, normal, parallel, perpendicular, etc., can refer to relative orientations, and are not intended to require strict adherence to specific geometric properties, unless otherwise noted. It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the -readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

As used in any embodiment herein, the term "logic" may refer to firmware or circuitry configured to perform any of the aforementioned operations. Firmware may be embodied as code, instructions or instruction sets, as data hard-coded (e.g., nonvolatile) in memory devices or circuitry, or combinations thereof.

"Circuitry," as used in any embodiment herein, may comprise, for example, any combination or permutation of hardwired circuitry, programmable circuitry, state machine circuitry, logic, or firmware that stores instructions executed by programmable circuitry. The circuitry may be embodied as an integrated circuit, such as an integrated circuit chip. In some embodiments, the circuitry may be formed, at least in part, by the processor circuitry executing code or instruction sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture.

Example 1 is a method comprising: receiving information from a user interface of a user device associated with a group of users, the group including first and second subgroups, each of the first and second subgroups including at least one user; determining a first estimated time for a first activity for the first subgroup; evaluating a plurality of activities to determine at least one of a second activity for the second subgroup or a third activity for the group proceeding the first and second activities to reduce an idle time of the group before the third activity, including using the determined first estimated time for the first activity for the first subgroup; and causing information about the determined second activity or the determined third activity to be displayed on a user experience application associated with the group.

In Example 2, the subject matter of Example 1, wherein evaluating the plurality of activities to reduce the idle time of the group before the third activity comprises determining the second and third activities to reduce a first idle time of the first subgroup after completion of the first activity and before a start of the third activity and a second idle time of the second subgroup after completion of the second activity and before the start of the third activity, wherein the third activity for the group includes an activity for both of the first and second subgroups.

In Example 3, the subject matter of any of Examples 1-2, comprising: determining an estimated time of the first subgroup to arrive at the third activity, including the determined first estimated time for the first activity for the first subgroup; determining an estimated time of the second subgroup to arrive at the third activity; and determining an estimated idle time of the group before the third activity using a difference between the determined estimated times of the first subgroup to arrive at the third activity and the second subgroup to arrive at the third activity, wherein evaluating the plurality of activities to reduce an idle time of the group before the third activity comprises using the determined estimated idle time of the group.

In Example 4, the subject matter of any of Examples 1-3, wherein evaluating the plurality of activities to determine the second and third activities comprises: determining a plurality of estimated times, including: a first time for the first subgroup to arrive at the third activity, the first time comprising: a transit time for the first subgroup to the first activity; an activity time for the first subgroup for the first activity, wherein the determined first estimated time for the first activity for the first subgroup includes the activity time for the first activity; and a transit time for the first subgroup from the first activity to the third activity; and a second time for the second subgroup to arrive at the third activity comprising: a transit time for the second subgroup to the second activity; an activity time for the second subgroup for the second activity; and a transit time for the second subgroup from the second activity to the third activity; and determining the second and third activities to reduce a difference between the first and second times.

In Example 5, the subject matter of Example 4, comprising: receiving real-time location information for the first and second subgroups; receiving real-time wait time information for the first, second, and third activities; determining a first wait time for a start of the first activity for the first subgroup after the first subgroup arrives at the first activity using the received real-time wait time information for the first activity and the received location information for the first subgroup; and determining a second wait time for a start of the second activity for the second subgroup after the second subgroup arrives at the second activity using the received real-time wait time information for the second activity and the received location information for the second subgroup, wherein the activity time for the first subgroup for the first activity comprises the determined first wait time for the start of the first activity for the first subgroup, wherein the activity time for the second subgroup for the second activity comprises the determined second wait time for the start of the second activity for the second subgroup.

In Example 6, the subject matter of any of Examples 1-5, comprising: in response to causing the information about at least one of the second and third activities to be displayed on the user experience application, receiving a selection of the second and third activities from the user experience application; determining routing instructions for the second subgroup to the second and third activities; and causing the determined routing instructions for the second subgroup to be displayed to the second and third activities on the user experience application, wherein the user experience application is executed on the user device of at least one user of the second subgroup.

In Example 7, the subject matter of Example 6, comprising: causing a representation of a location of the first subgroup to be displayed on the user experience application and a remaining portion of the first time for the first subgroup to arrive at the third activity.

In Example 8, the subject matter of any of Examples 1-7, wherein the user experience application comprises an experience application for a venue, the venue comprises an amusement park, and one or more of the first second, and third activities comprises a ride, an activity, a resource, or a location of the amusement park.

In Example 9, the subject matter of any of Examples 1-8, wherein evaluating the plurality of activities to determine the second and third activities comprises: determining routing information for the first and second subgroups to the third activity to reduce the idle time of the first and second subgroups, wherein the idle time includes an estimated wait time for one of the first and second subgroups at the third activity for another of the first and second subgroups at the third activity after completion of the first and second activities, separate from a transit time or distance associated with the routing information.

In Example 10, the subject matter of any of Examples 1-9, wherein causing information about the determined second and third activities to be displayed on the user experience application comprises: causing the determined second activity to be displayed on the user experience application associated with the second subgroup; receiving a selection of the second activity from the user experience application associated with the second subgroup, in response to receiving the selection of the second activity, evaluating the plurality of activities to determine the third activity using the received selection of the second activity from the user experience application; causing the determined third activity to be displayed on the user experience application associated with the second subgroup; receiving a selection of the third activity from the user experience application associated with the second subgroup; determining routing instructions for the second subgroup to the selected second and third activities; causing the determined routing instructions for the second subgroup to be displayed to the selected second and third activities on the user experience application associated with the second subgroup.

In Example 11, the subject matter of any of Examples 1-10, comprising: in response to causing information about the determined second activity or the second and third activities to be displayed on the user experience application, receiving a selection of the second and third activities from the user experience application; determining routing instructions for the second subgroup to the second and third activities; causing the determined routing instructions for the second subgroup to be displayed to the second and third activities on the user experience application.

In Example 12, the subject matter of any of Examples 1-11, wherein receiving information from the user interface of the user device associated with the group of users comprises receiving the first activity for the first subgroup and the second activity for the second subgroup, wherein determining the first estimated time for the first activity for the first subgroup comprises: receiving real-time location information for the first subgroup; and determining the first estimated time for the first activity for the first subgroup using the received real-time location information for the first subgroup and information about the first activity, including a location of the first activity, wherein evaluating the plurality of activities comprises: receiving real-time location information for the second subgroup; determining an estimated time for the second activity for the second subgroup using the received real-time location information for the second subgroup and information about the second activity, including a location of the second activity; and determining the third activity for the group proceeding the first and second activities to reduce the idle time of the group before the third activity using the determined estimated times for the first and second activities, the received real-time location information for the first and second subgroups, and information about the third activity, including a location of the third activity.

In Example 13, the subject matter of any of Examples 1-12, wherein receiving information comprises receiving a request for information from a user experience application associated with one of the first or second subgroups, the method comprising: in response to causing the second and third activities to be displayed on the user experience application, receiving a selection of the third activity from the user experience application; determining routing instructions for the first subgroup to the third activity; and causing the determined routing instructions for the first subgroup to be displayed to the third activity on a user experience application associated with the first subgroup.

Example 14 is a system comprising: one or more processors; and a memory storing computer-executable instructions that, when executed, cause the one or more processors to control the system to perform operations comprising: receiving information from a user interface of a user device associated with a group of users, the group including first and second subgroups, each of the first and second subgroups including at least one user; determining a first estimated time for a first activity for the first subgroup; evaluating a plurality of activities to determine at least one of a second activity for the second subgroup or a third activity for the group proceeding the first and second activities to reduce an idle time of the group before the third activity, including using the determined first estimated time for the first activity for the first subgroup; and causing information about the determined second activity or the determined third activity to be displayed on a user experience application associated with the group.

In Example 15, the subject matter of Example 14, wherein evaluating the plurality of activities to reduce the idle time of the group before the third activity comprises determining the second and third activities to reduce a first idle time of the first subgroup after completion of the first activity and before a start of the third activity and a second idle time of the second subgroup after completion of the second activity and before the start of the third activity, wherein the third activity for the group includes an activity for both of the first and second subgroups.

In Example 16, the subject matter of any of Examples 14-15, wherein the operations comprise: determining an estimated time of the first subgroup to arrive at the third activity, including the determined first estimated time for the first activity for the first subgroup; determining an estimated time of the second subgroup to arrive at the third activity; and determining an estimated idle time of the group before the third activity using a difference between the determined estimated times of the first subgroup to arrive at the third activity and the second subgroup to arrive at the third activity, wherein evaluating the plurality of activities to reduce an idle time of the group before the third activity comprises using the determined estimated idle time of the group.

In Example 17, the subject matter of any of Examples 14-16, wherein evaluating the plurality of activities to determine the second and third activities comprises: determining a plurality of estimated times, including: a first time for the first subgroup to arrive at the third activity, the first time comprising: a transit time for the first subgroup to the first activity; an activity time for the first subgroup for the first activity, wherein the determined first estimated time for the first activity for the first subgroup includes the activity time for the first activity; and a transit time for the first subgroup from the first activity to the third activity; and a second time for the second subgroup to arrive at the third activity comprising: a transit time for the second subgroup to the second activity; an activity time for the second subgroup for the second activity; and a transit time for the second subgroup from the second activity to the third activity; and determining the second and third activities to reduce a difference between the first and second times.

In Example 18, the subject matter of Example 17, wherein the operations comprise: receiving real-time location information for the first and second subgroups; receiving real-time wait time information for the first, second, and third activities; determining a first wait time for a start of the first activity for the first subgroup after the first subgroup arrives at the first activity using the received real-time wait time information for the first activity and the received location information for the first subgroup; and determining a second wait time for a start of the second activity for the second subgroup after the second subgroup arrives at the second activity using the received real-time wait time information for the second activity and the received location information for the second subgroup, wherein the activity time for the first subgroup for the first activity comprises the determined first wait time for the start of the first activity for the first subgroup, wherein the activity time for the second subgroup for the second activity comprises the determined second wait time for the start of the second activity for the second subgroup.

In Example 19, the subject matter of any of Examples 14-18, wherein the operations comprise: in response to causing the information about at least one of the second and third activities to be displayed on the user experience application, receiving a selection of the second and third activities from the user experience application; determining routing instructions for the second subgroup to the second and third activities; and causing the determined routing instructions for the second subgroup to be displayed to the second and third activities on the user experience application, wherein the user experience application is executed on the user device of at least one user of the second subgroup.

In Example 20, the subject matter of Example 19, wherein the operations comprise: causing a representation of a location of the first subgroup to be displayed on the user experience application and a remaining portion of the first time for the first subgroup to arrive at the third activity.

In Example 21, the subject matter of any of Examples 14-20, wherein the user experience application comprises an experience application for a venue, the venue comprises an amusement park, and one or more of the first second, and third activities comprises a ride, an activity, a resource, or a location of the amusement park.

In Example 22, the subject matter of any of Examples 14-21, wherein evaluating the plurality of activities to determine the second and third activities comprises: determining routing information for the first and second subgroups to the third activity to reduce the idle time of the first and second subgroups, wherein the idle time includes an estimated wait time for one of the first and second subgroups at the third activity for another of the first and second subgroups at the third activity after completion of the first and second activities, separate from a transit time or distance associated with the routing information.

In Example 23, the subject matter of any of Examples 14-22, wherein causing information about the determined second and third activities to be displayed on the user experience application comprises: causing the determined second activity to be displayed on the user experience application associated with the second subgroup; receiving a selection of the second activity from the user experience application associated with the second subgroup, in response to receiving the selection of the second activity, evaluating the plurality of activities to determine the third activity using the received selection of the second activity from the user experience application; causing the determined third activity to be displayed on the user experience application associated with the second subgroup; receiving a selection of the third activity from the user experience application associated with the second subgroup; determining routing instructions for the second subgroup to the selected second and third activities; causing the determined routing instructions for the second subgroup to be displayed to the selected second and third activities on the user experience application associated with the second subgroup.

In Example 24, the subject matter of any of Examples 14-23, wherein the operations comprise: in response to causing information about the determined second activity or the second and third activities to be displayed on the user experience application, receiving a selection of the second and third activities from the user experience application; determining routing instructions for the second subgroup to the second and third activities; causing the determined routing instructions for the second subgroup to be displayed to the second and third activities on the user experience application.

In Example 25, the subject matter of any of Examples 14-24, wherein receiving information from the user interface comprises receiving the first activity for the first subgroup and the second activity for the second subgroup, wherein determining the first estimated time for the first activity for the first subgroup comprises: receiving real-time location information for the first subgroup; and determining the first estimated time for the first activity for the first subgroup using the received real-time location information for the first subgroup and information about the first activity, including a location of the first activity, wherein evaluating the plurality of activities comprises: receiving real-time location information for the second subgroup; determining an estimated time for the second activity for the second subgroup using the received real-time location information for the second subgroup and information about the second activity, including a location of the second activity; and determining the third activity for the group proceeding the first and second activities to reduce the idle time of the group before the third activity using the determined estimated times for the first and second activities, the received real-time location information for the first and second subgroups, and information about the third activity, including a location of the third activity.

In Example 26, the subject matter of any of Examples 14-25, wherein receiving information from the user interface comprises receiving a request for information from a user experience application associated with one of the first or second subgroups, wherein the operations comprise: in response to causing the second and third activities to be displayed on the user experience application, receiving a selection of the third activity from the user experience application; determining routing instructions for the first subgroup to the third activity; and causing the determined routing instructions for the first subgroup to be displayed to the third activity on a user experience application associated with the first subgroup.

Example 27 is at least one machine-readable medium including instructions that, when executed by processing circuitry, cause the processing circuitry to perform operations to implement of any of Examples 1-26.

Example 28 is an apparatus comprising means to implement of any of Examples 1-26.

Example 29 is a system to implement of any of Examples 1-26.

Example 30 is a method to implement of any of Examples 1-26.

The above detailed description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the disclosure should, therefore, be determined with references to the appended claims, along with the full scope of equivalents to which such claims are entitled.

What is claimed is:

1. A method comprising:

receiving information from a user interface of a user device associated with a group of users, the group including first and second subgroups, each of the first and second subgroups including at least one user;

determining a first estimated time for a first activity for the first subgroup;

evaluating a plurality of activities to determine at least one of a second activity for the second subgroup or a third activity for the group proceeding the first and second activities to reduce an idle time of the group before the third activity, including using the determined first estimated time for the first activity for the first subgroup;

determining an estimated time of the first subgroup to arrive at the third activity, including the determined first estimated time for the first activity for the first subgroup;

determining an estimated time of the second subgroup to arrive at the third activity; and determining an estimated idle time of the group before the third activity using a difference between the determined estimated times of the first subgroup to arrive at the third activity and the second subgroup to arrive at the third activity, wherein evaluating the plurality of activities to reduce an idle time of the group before the third activity comprises using the determined estimated idle time of the group; and causing information about the determined second activity or the determined third activity to be displayed on a user experience application associated with the group.

2. The method of claim 1, wherein evaluating the plurality of activities to reduce the idle time of the group before the third activity comprises determining the second and third activities to reduce a first idle time of the first subgroup after completion of the first activity and before a start of the third activity and a second idle time of the second subgroup after completion of the second activity and before the start of the third activity, wherein the third activity for the group includes an activity for both of the first and second subgroups.

3. The method of claim 1, wherein evaluating the plurality of activities to determine the second and third activities comprises:

determining a plurality of estimated times, including:

a first time for the first subgroup to arrive at the third activity, the first time comprising:

a transit time for the first subgroup to the first activity;

an activity time for the first subgroup for the first activity, wherein the determined first estimated time for the first activity for the first subgroup includes the activity time for the first activity; and a transit time for the first subgroup from the first activity to the third activity; and a second time for the second subgroup to arrive at the third activity comprising:

a transit time for the second subgroup to the second activity;
an activity time for the second subgroup for the second activity; and
a transit time for the second subgroup from the second activity to the third activity; and
determining the second and third activities to reduce a difference between the first and second times.

4. The method of claim 3, comprising:
receiving real-time location information for the first and second subgroups;
receiving real-time wait time information for the first, second, and third activities;
determining a first wait time for a start of the first activity for the first subgroup after the first subgroup arrives at the first activity using the received real-time wait time information for the first activity and the received location information for the first subgroup; and
determining a second wait time for a start of the second activity for the second subgroup after the second subgroup arrives at the second activity using the received real-time wait time information for the second activity and the received location information for the second subgroup,
wherein the activity time for the first subgroup for the first activity comprises the determined first wait time for the start of the first activity for the first subgroup,
wherein the activity time for the second subgroup for the second activity comprises the determined second wait time for the start of the second activity for the second subgroup.

5. The method of claim 1, comprising:
in response to causing the information about at least one of the second and third activities to be displayed on the user experience application, receiving a selection of the second and third activities from the user experience application;
determining routing instructions for the second subgroup to the second and third activities; and
causing the determined routing instructions for the second subgroup to be displayed to the second and third activities on the user experience application,
wherein the user experience application is executed on the user device of at least one user of the second subgroup.

6. The method of claim 5, comprising:
causing a representation of a location of the first subgroup to be displayed on the user experience application and a remaining portion of the first time for the first subgroup to arrive at the third activity.

7. The method of claim 1, wherein the user experience application comprises an experience application for a venue, the venue comprises an amusement park, and one or more of the first second, and third activities comprises a ride, an activity, a resource, or a location of the amusement park.

8. The method of claim 1, wherein evaluating the plurality of activities to determine the second and third activities comprises:
determining routing information for the first and second subgroups to the third activity to reduce the idle time of the first and second subgroups,
wherein the idle time includes an estimated wait time for one of the first and second subgroups at the third activity for another of the first and second subgroups at the third activity after completion of the first and second activities, separate from a transit time or distance associated with the routing information.

9. The method of claim 1, wherein causing information about the determined second and third activities to be displayed on the user experience application comprises:
causing the determined second activity to be displayed on the user experience application associated with the second subgroup;
receiving a selection of the second activity from the user experience application associated with the second subgroup,
in response to receiving the selection of the second activity, evaluating the plurality of activities to determine the third activity using the received selection of the second activity from the user experience application;
causing the determined third activity to be displayed on the user experience application associated with the second subgroup;
receiving a selection of the third activity from the user experience application associated with the second subgroup;
determining routing instructions for the second subgroup to the selected second and third activities;
causing the determined routing instructions for the second subgroup to be displayed to the selected second and third activities on the user experience application associated with the second subgroup.

10. The method of claim 1, comprising:
in response to causing information about the determined second activity or the second and third activities to be displayed on the user experience application, receiving a selection of the second and third activities from the user experience application;
determining routing instructions for the second subgroup to the second and third activities;
causing the determined routing instructions for the second subgroup to be displayed to the second and third activities on the user experience application.

11. The method of claim 1, wherein receiving information from the user interface of the user device associated with the group of users comprises receiving the first activity for the first subgroup and the second activity for the second subgroup,
wherein determining the first estimated time for the first activity for the first subgroup comprises:
receiving real-time location information for the first subgroup; and
determining the first estimated time for the first activity for the first subgroup using the received real-time location information for the first subgroup and information about the first activity, including a location of the first activity,
wherein evaluating the plurality of activities comprises:
receiving real-time location information for the second subgroup;
determining an estimated time for the second activity for the second subgroup using the received real-time location information for the second subgroup and information about the second activity, including a location of the second activity; and
determining the third activity for the group proceeding the first and second activities to reduce the idle time of the group before the third activity using the determined estimated times for the first and second activities, the received real-time location information for the first and second subgroups, and information about the third activity, including a location of the third activity.

12. The method of claim 1, wherein receiving information comprises receiving a request for information from a user experience application associated with one of the first or second subgroups, the method comprising:

in response to causing the second and third activities to be displayed on the user experience application, receiving a selection of the third activity from the user experience application;

determining routing instructions for the first subgroup to the third activity; and causing the determined routing instructions for the first subgroup to be displayed to the third activity on a user experience application associated with the first subgroup.

13. A system comprising:

one or more processors; and a memory storing computer-executable instructions that, when executed, cause the one or more processors to control the system to perform operations comprising:

receiving information from a user interface of a user device associated with a group of users, the group including first and second subgroups, each of the first and second subgroups including at least one user;

determining a first estimated time for a first activity for the first subgroup;

evaluating a plurality of activities to determine at least one of a second activity for the second subgroup or a third activity for the group proceeding the first and second activities to reduce an idle time of the group before the third activity, including using the determined first estimated time for the first activity for the first subgroup;

determining an estimated time of the first subgroup to arrive at the third activity, including the determined first estimated time for the first activity for the first subgroup;

determining an estimated time of the second subgroup to arrive at the third activity; and determining an estimated idle time of the group before the third activity using a difference between the determined estimated times of the first subgroup to arrive at the third activity and the second subgroup to arrive at the third activity, wherein evaluating the plurality of activities to reduce an idle time of the group before the third activity comprises using the determined estimated idle time of the group; and causing information about the determined second activity or the determined third activity to be displayed on a user experience application associated with the group.

14. The system of claim 13, wherein evaluating the plurality of activities to reduce the idle time of the group before the third activity comprises determining the second and third activities to reduce a first idle time of the first subgroup after completion of the first activity and before a start of the third activity and a second idle time of the second subgroup after completion of the second activity and before the start of the third activity, wherein the third activity for the group includes an activity for both of the first and second subgroups.

15. The system of claim 13, wherein the operations comprise:

in response to causing the information about at least one of the second and third activities to be displayed on the user experience application, receiving a selection of the second and third activities from the user experience application;

determining routing instructions for the second subgroup to the second and third activities;

causing the determined routing instructions for the second subgroup to be displayed to the second and third activities on the user experience application, and causing a representation of a location of the first subgroup to be displayed on the user experience application, wherein the user experience application is executed on the user device of at least one user of the second subgroup.

16. The system of claim 13, wherein causing information about the determined second and third activities to be displayed on the user experience application comprises:

causing the determined second activity to be displayed on the user experience application associated with the second subgroup;

receiving a selection of the second activity from the user experience application associated with the second subgroup, in response to receiving the selection of the second activity, evaluating the plurality of activities to determine the third activity using the received selection of the second activity from the user experience application;

causing the determined third activity to be displayed on the user experience application associated with the second subgroup;

receiving a selection of the third activity from the user experience application associated with the second subgroup;

determining routing instructions for the second subgroup to the selected second and third activities;

causing the determined routing instructions for the second subgroup to be displayed to the selected second and third activities on the user experience application associated with the second subgroup.

17. The system of claim 13, wherein receiving information from the user interface comprises receiving the first activity for the first subgroup and the second activity for the second subgroup, wherein determining the first estimated time for the first activity for the first subgroup comprises:

receiving real-time location information for the first subgroup; and determining the first estimated time for the first activity for the first subgroup using the received real-time location information for the first subgroup and information about the first activity, including a location of the first activity, wherein evaluating the plurality of activities comprises:

receiving real-time location information for the second subgroup;

determining an estimated time for the second activity for the second subgroup using the received real-time location information for the second subgroup and information about the second activity, including a location of the second activity; and determining the third activity for the group proceeding the first and second activities to reduce the idle time of the group before the third activity using the determined estimated times for the first and second activities, the received real-time location information for the first and second subgroups, and information about the third activity, including a location of the third activity.

18. The system of claim 13, wherein receiving information from the user interface comprises receiving a request for information from a user experience application associated with one of the first or second subgroups, wherein the operations comprise:

in response to causing the second and third activities to be displayed on the user experience application, receiving a selection of the third activity from the user experience application;

determining routing instructions for the first subgroup to the third activity; and causing the determined routing instructions for the first subgroup to be displayed to the third activity on a user experience application associated with the first subgroup.

19. A method comprising:

receiving information from a user interface of a user device associated with a group of users, the group including first and second subgroups, each of the first and second subgroups including at least one user;

determining a first estimated time for a first activity for the first subgroup;

evaluating a plurality of activities to determine at least one of a second activity for the second subgroup or a third activity for the group proceeding the first and second activities to reduce an idle time of the group before the third activity, including using the determined first estimated time for the first activity for the first subgroup, wherein evaluating the plurality of activities to determine the second and third activities comprises:

determining routing information for the first and second subgroups to the third activity to reduce the idle time of the first and second subgroups, wherein the idle time includes an estimated wait time for one of the first and second subgroups at the third activity for another of the first and second subgroups at the third activity after completion of the first and second activities, separate from a transit time or distance associated with the routing information; and causing information about the determined second activity or the determined third activity to be displayed on a user experience application associated with the group.

* * * * *